United States Patent
Self

[19]

[11] Patent Number: 6,164,804
[45] Date of Patent: Dec. 26, 2000

[54] TRUCK LIGHT BAR AND MUDFLAP HOLDER APPARATUS

[76] Inventor: Walter H. Self, 906 Estancia NW., Albuquerque, N. Mex. 87105

[21] Appl. No.: 09/366,366

[22] Filed: Aug. 3, 1999

Related U.S. Application Data

[60] Provisional application No. 60/096,314, Aug. 12, 1998.

[51] Int. Cl.[7] .................................................. B60Q 1/00
[52] U.S. Cl. ........................ 362/485; 362/506; 362/543
[58] Field of Search .................................. 362/478, 485, 362/500, 506, 543, 544, 545

[56] References Cited

U.S. PATENT DOCUMENTS

| | | | |
|---|---|---|---|
| 4,319,764 | 3/1982 | Whitaker | 280/154 |
| 4,413,839 | 11/1983 | McCain | 280/154.5 R |
| 4,658,335 | 4/1987 | Culler | 362/396 |
| 4,819,132 | 4/1989 | Hwan et al. | 296/91 |
| 4,924,209 | 5/1990 | Kao | 362/506 X |
| 5,025,351 | 6/1991 | Martin | 362/506 |
| 5,157,591 | 10/1992 | Chudzik | 362/485 |

*Primary Examiner*—Stephen Husar

[57] ABSTRACT

A truck light bar and mudflap holder apparatus includes a beam-to-body resilient connection assembly for connection to a portion of a truck body. A support beam is connected to the beam-to-body resilient connection assembly, and light modules are supported by the support beam. A mudflap assembly is supported by the support beam. The resilient nature of the beam-to-body resilient connection assembly permits the truck light bar and mudflap holder apparatus of the invention to yield to outside forces without being broken or damaged. When the outside forces are removed, the truck light bar and mudflap holder apparatus returns to the original position. With one embodiment of the invention, the beam-to-body resilient connection assembly includes an attachment bracket connected to the truck body, and a rotation hinge is connected to the attachment bracket. A spiral beam bias spring is connected between the support beam and the attachment bracket.

14 Claims, 4 Drawing Sheets

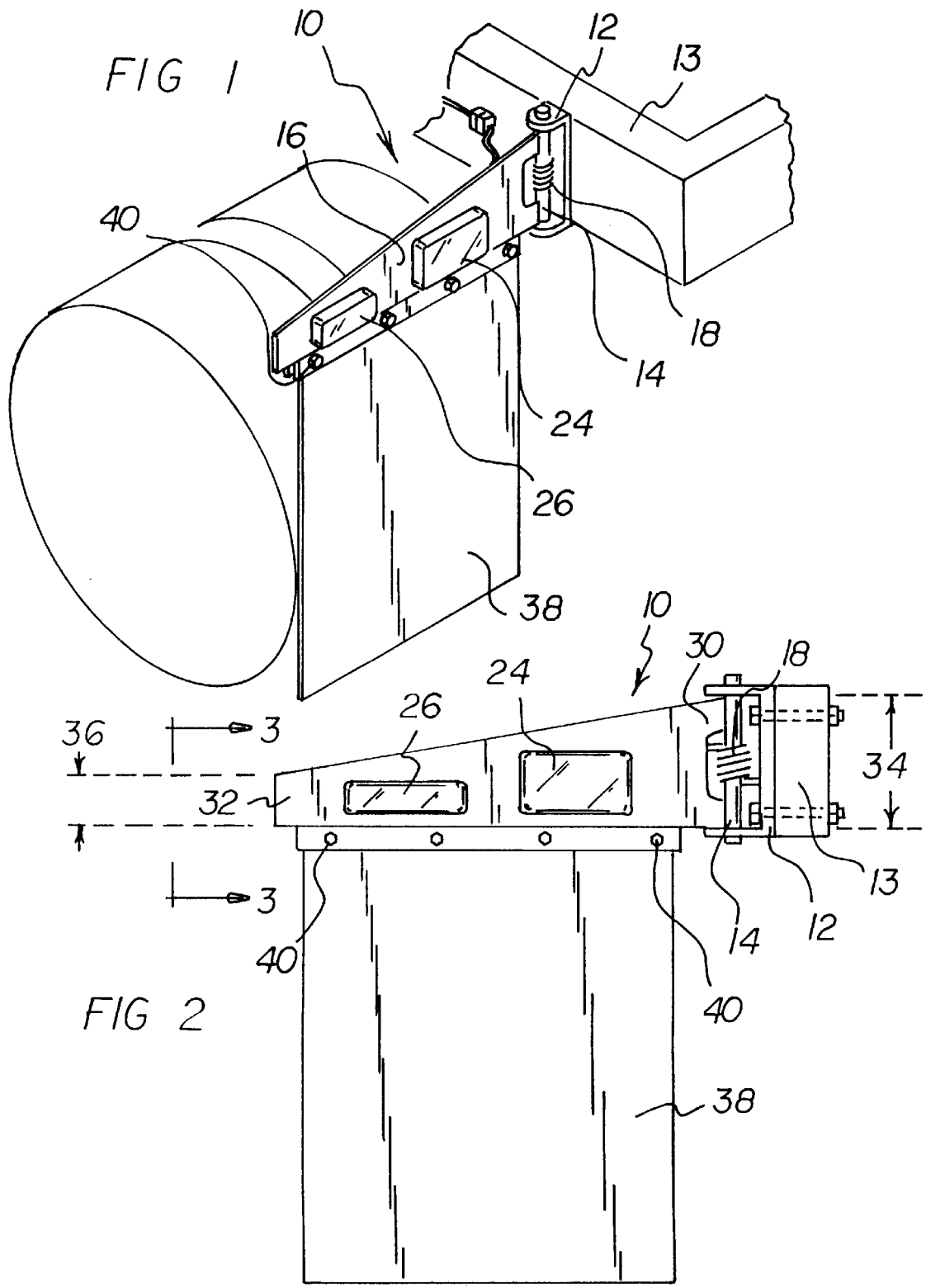

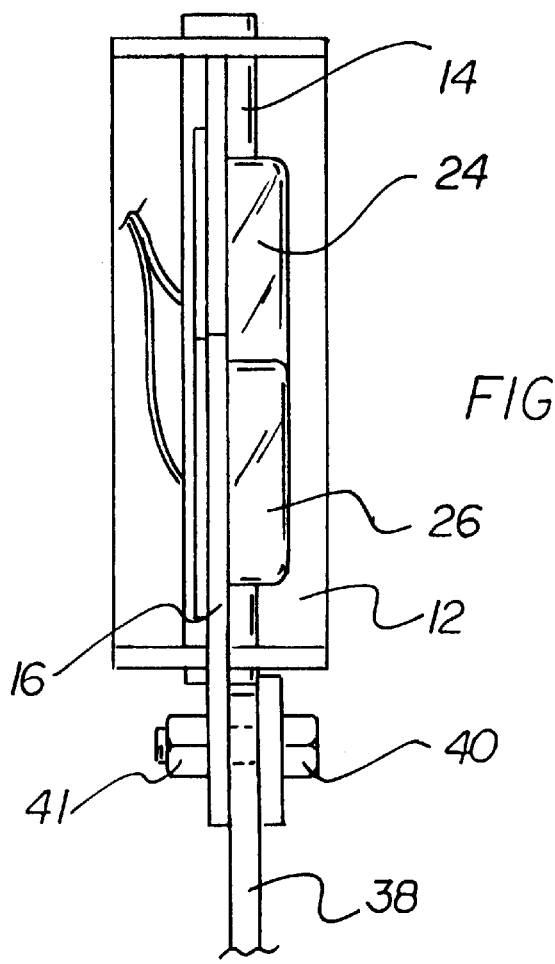
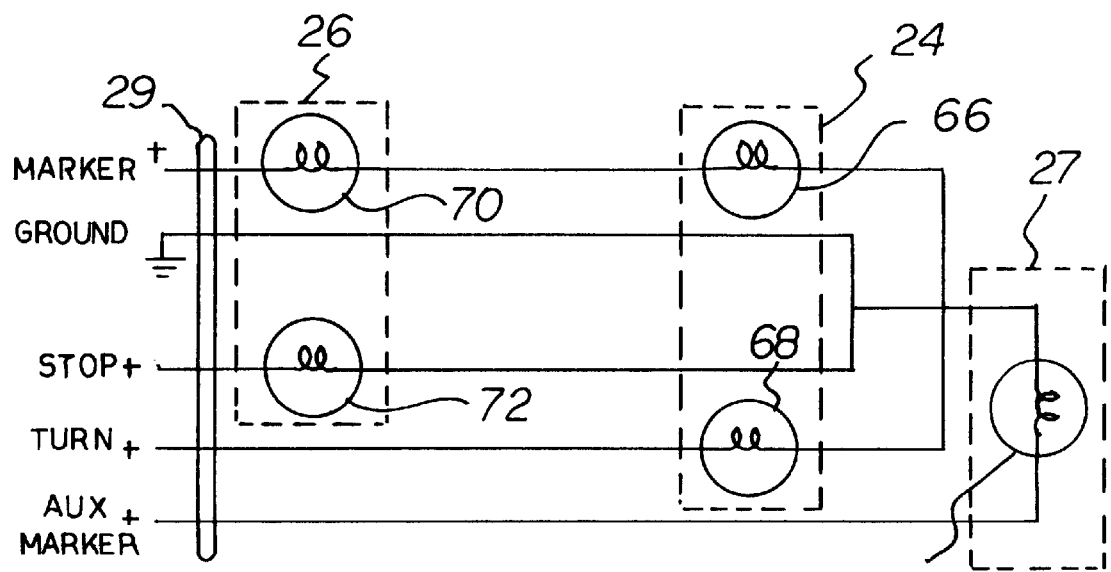

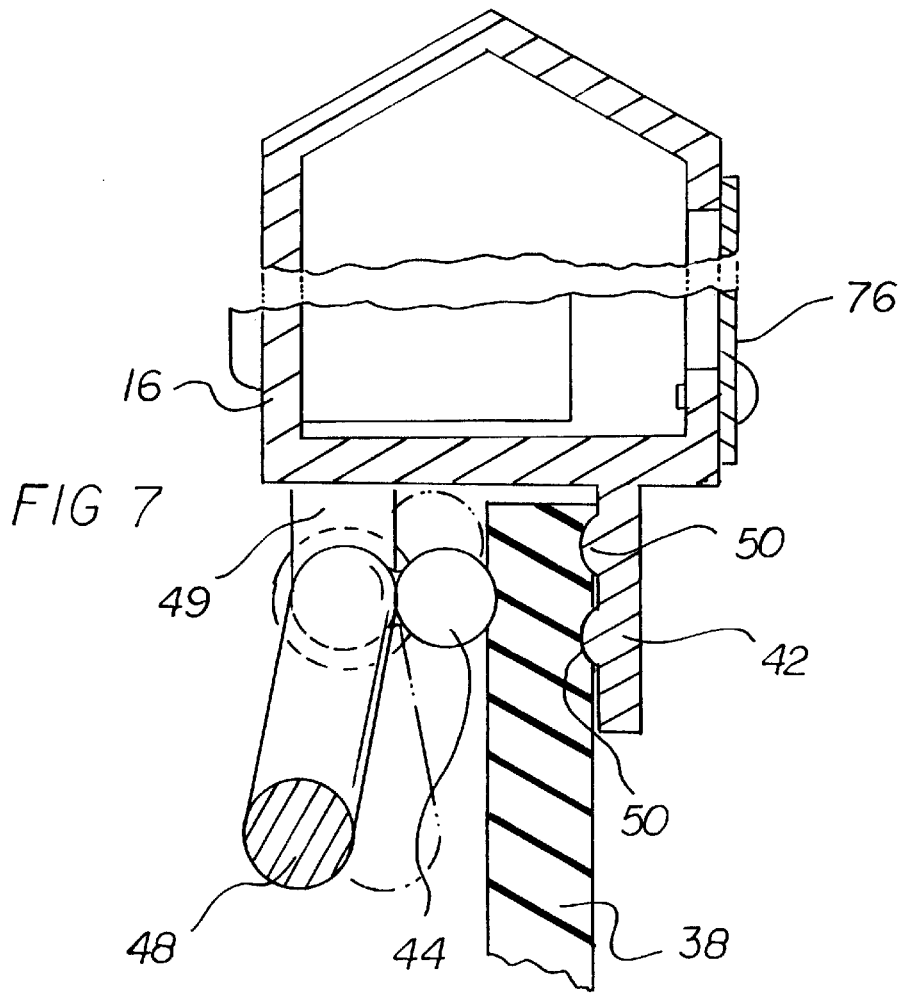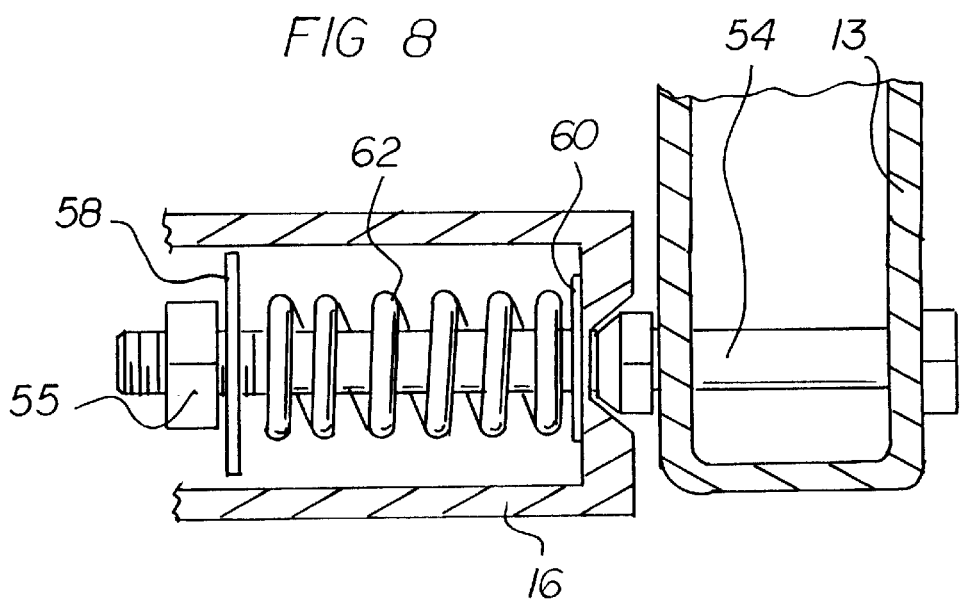

TRUCK LIGHT BAR AND MUDFLAP HOLDER APPARATUS

CROSS-REFERENCE TO RELATED APPLICATION

This application claims priority based upon my copending Provisional Application Ser. No. 60/096,314, filed Aug. 12, 1998.

BACKGROUND OF THE INVENTION

1. Field of the Invention

The present invention relates generally to lighting devices for automotive vehicles, and, more particularly, to lighting devices especially adapted for use with mudflaps.

2. Description of the Prior Art

Mudflaps for vehicles are known as is the association of mudflaps with lighting devices. In this respect, the following U.S. patents are representative of some innovations relating to mudflaps associated with lighting devices: 4,319,764, 4,413,839, and 5,157,591. More specifically, U.S. Pat. No. 4,319,764 discloses a mudflap mounting device in which a mudflap is mounted on a mounting rod that is coaxial with and radiates from its vehicle-mounted support. To reduce unwanted leverage between the mudflap and its support due to the radiating mounting rod, it would be desirable if a mudflap support were provided in which the mudflap is not supported coaxial with and radiating from its support.

U.S. Pat. No. 4,413,839 discloses a mudflap that has a lighting device mounted directly on the mudflap. Since the mudflap is highly susceptible to the accumulation of dirt and mud, it would be desirable if a lighting device were not mounted directly on the mudflap itself.

U.S. Pat. No. 5,157,591 discloses an auxiliary lighting system for a vehicle. When associated with the rear wheels of a vehicle, the auxiliary lighting system is supported by the vehicle in such a manner that auxiliary lights can swing toward the front and toward the rear of the vehicle around a horizontal axis. In addition, the auxiliary lights are mounted on the rearmost side of the vehicle frame. For convenience, it would be desirable if supports for auxiliary lights were mounted on the sides of the vehicle frame. In addition, with supports mounted on the sides of the vehicle frame, it would be desirable if the auxiliary lights can swing toward the front and toward the rear of the vehicle around vertical axes. In these respects, it would be desirable if auxiliary lights for a vehicle were mounted on the sides of a vehicle frame and included a vertically oriented axis of rotation.

In addition, the following U.S. patents may also be of interest. U.S. Pat. No. 4,658,335 discloses a resilient mounting mechanism for vehicle tail lights. The tail lights swing forward and backward around a horizontal axis. In U.S. Pat. No. 4,819,132 discloses a spoiler which includes a third brake light. The spoiler rotates around a horizontal axis.

Still other features would be desirable in a truck light bar and mudflap holder apparatus. For example, it would be desirable if a truck light bar and mudflap holder apparatus were provided with a mudflap clamp that permitted a mudflap to be easily removed and replaced. With respect to the lights in the light bar, it would be desirable if a light bar lights could serve as auxiliary directional signals. When a truck light bar and mudflap holder apparatus encounters road obstacles and other road conditions which cause the mudflap to rotate around a support axis, it would be desirable if a spring is present that is biased to restore the mudflap to its original orientation.

Thus, while the foregoing body of prior art indicates it to be well known to use mudflaps associated with lighting devices, the prior art described above does not teach or suggest a truck light bar and mudflap holder apparatus which has the following combination of desirable features: (1) is not supported in such a way that it is coaxial with and radiates from its support on the truck; (2) includes lighting devices that are not mounted directly on the mudflap itself; (3) has auxiliary light supports that are mounted on the sides of a vehicle frame and that include vertically oriented axes of rotation; (4) includes a mudflap clamp that permits a mudflap to be easily removed and replaced; (5) has light bar lights can serve as auxiliary directional signals; and (6) has springs that are biased to restore the mudflaps to their original orientations when rotated by road conditions. The foregoing desired characteristics are provided by the unique truck light bar and mudflap holder apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a truck light bar and mudflap holder apparatus which includes a beam-to-body resilient connection assembly for connection to a portion of a truck body. A support beam is connected to the beam-to-body resilient connection assembly, and light modules supported by the support beam. A mudflap assembly is supported by the support beam. The resilient nature of the beam-to-body resilient connection assembly permits the truck light bar and mudflap holder apparatus of the invention to yield to outside forces without being broken or damaged. When the outside forces are removed, the truck light bar and mudflap holder apparatus returns to the original position.

With one embodiment of the invention, the beam-to-body resilient connection assembly includes an attachment bracket connected to the truck body, and a rotation hinge is connected to the attachment bracket. A beam bias spring is connected between the support beam and the attachment bracket. The beam bias spring is a spiral spring. The rotation hinge extends through a central portion of the beam bias spiral spring.

The light modules includes a first light module, a second light module, and a third light module. The support beam includes a first beam end proximal to beam-to-body resilient connection assembly and a second beam end distal to the beam-to-body resilient connection assembly. The first beam end has a first beam height, the second beam end has a second beam height, and the first beam height is greater than the second beam height.

With one embodiment of the invention, the mudflap assembly includes a mudflap unit and a mudflap-to-beam connector for connecting the mudflap unit to the support beam. The mudflap-to-beam connector includes connection bolts and nuts for connecting the mudflap unit to the support beam.

With another embodiment of the invention, the mudflap-to-beam connector includes a first clamp member connected to the support beam. A second clamp member is supported by the support beam. The second clamp member is attached to a clamp hinge pin, wherein a clamp handle is formed from the clamp hinge pin. The clamp hinge pin is supported by clamp support brackets which extend downward from the support beam, and clamp springs are connected between the second clamp member and the support beam. The first clamp member includes ridges for gripping the mudflap unit.

With this embodiment of the invention, the beam-to-body resilient connection assembly includes suspension bolts connected to the truck body and extending from the truck body into the support beam. Spring shock absorber assemblies are supported on the suspension bolts. The spring shock absorber assemblies includes distal stop members supported on the suspension bolts, proximal stop members supported on the suspension bolts, and shock absorber springs supported on the suspension bolts between the distal stop members and the proximal stop members.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved truck light bar and mudflap holder apparatus which has all of the advantages of the prior art and none of the disadvantages.

It is another object of the present invention to provide a new and improved truck light bar and mudflap holder apparatus which may be easily and efficiently manufactured and marketed.

It is a further object of the present invention to provide a new and improved truck light bar and mudflap holder apparatus which is of durable and reliable construction.

An even further object of the present invention is to provide a new and improved truck light bar and mudflap holder apparatus which is susceptible of a low cost of manufacture with regard to both materials and labor, and which accordingly is then susceptible of low prices of sale to the consuming public, thereby making such truck light bar and mudflap holder apparatus available to the buying public.

Still yet a further object of the present invention is to provide a new and improved truck light bar and mudflap holder apparatus which is not supported in such a way that it is coaxial with and radiates from its support on the truck.

Still another object of the present invention is to provide a new and improved truck light bar and mudflap holder apparatus that includes lighting devices that are not mounted directly on the mudflap itself.

Yet another object of the present invention is to provide a new and improved truck light bar and mudflap holder apparatus which has auxiliary light supports that are mounted on the sides of a vehicle frame and that include vertically oriented axes of rotation.

Even another object of the present invention is to provide a new and improved truck light bar and mudflap holder apparatus that includes a mudflap clamp that permits a mudflap to be easily removed and replaced.

Still a further object of the present invention is to provide a new and improved truck light bar and mudflap holder apparatus which has light bar lights that can serve as auxiliary directional signals.

Yet another object of the present invention is to provide a new and improved truck light bar and mudflap holder apparatus that has springs that are biased to restore the mudflaps to their original orientations when rotated by road conditions.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first preferred embodiment of the truck light bar and mudflap holder apparatus of the invention.

FIG. 2 is a rear view of the embodiment of the truck light bar and mudflap holder apparatus shown in FIG. 1.

FIG. 3 is an enlarged, partial edge view of the embodiment of the truck light bar and mudflap holder apparatus of FIG. 2 taken along line 3—3 thereof.

FIG. 4 is an electrical circuit diagram of the circuit powering the lights on the truck light bar and mudflap holder apparatus of the invention.

FIG. 7 is an enlarged partial perspective view of the embodiment of the invention shown in FIG. 5 taken along line 7—7 thereof.

FIG. 8 is an enlarged partial perspective view of the embodiment of the invention shown in FIG. 5 taken along line 8—8 thereof.

DESCRIPTION OF THE PREFERRED EMBODIMENT

Figure 5:
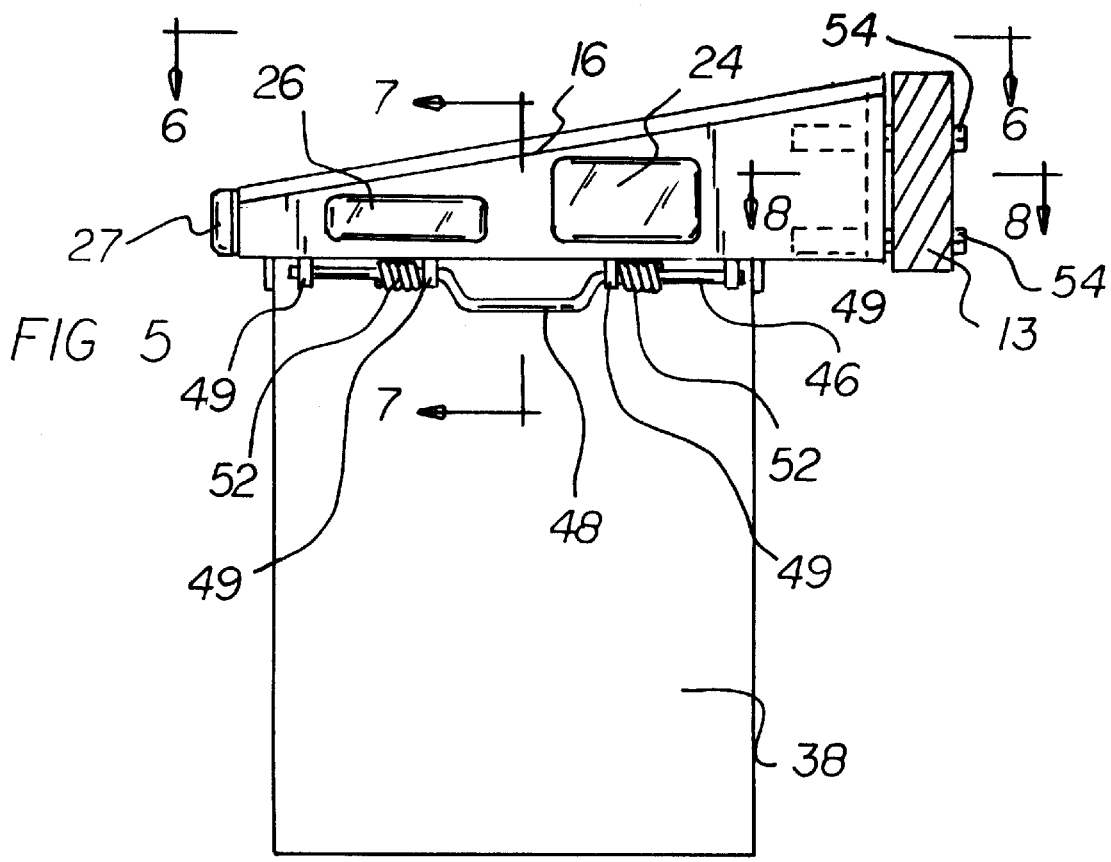
FIG. 5 is a rear view of a second embodiment of the truck light bar and mudflap holder apparatus of the invention.

With reference to the drawings, a new and improved truck light bar and mudflap holder apparatus embodying the principles and concepts of the present invention will be described.

Turning to FIGS. 1–4, there is shown an exemplary embodiment of the truck light bar and mudflap holder apparatus of the invention generally designated by reference numeral 10. In its preferred form, truck light bar and mudflap holder apparatus 10 includes a beam-to-body resilient connection assembly for connection to a portion of a truck body. A support beam 16 is connected to the beam-to-body resilient connection assembly, and light modules supported by the support beam 16. A mudflap assembly is supported by the support beam 16.

With one embodiment of the invention, shown in FIGS. 1–4, the beam-to-body resilient connection assembly includes an attachment bracket 12 connected to the truck body, and a rotation hinge 14 is connected to the attachment bracket 12. A beam bias spring 18 is connected between the support beam 16 and the attachment bracket 12. The beam bias spring 18 is a spiral spring. The rotation hinge 14 extends through a central portion of the beam bias spiral spring 18.

In accordance with the present invention, the support beam serves as a mounting member or platform for one or more of the light modules. Preferably, the light modules includes a first light module 24, a second light module 26, and a third light module 27 (FIGS. 5–8). The support beam 16 includes a first beam end 30 proximal to beam-to-body resilient connection assembly and a second beam end 32 distal to the beam-to-body resilient connection assembly. The first beam end 30 has a first beam height 34, the second beam end 32 has a second beam height 36, and the first beam height 34 is greater than the second beam height 36.

With one embodiment of the invention (FIGS. 1–4), the mudflap assembly includes a mudflap unit 38 and a mudflap-to-beam connector for connecting the mudflap unit 38 to the support beam 16. The mudflap-to-beam connector includes connection bolts 40 and nuts 41 for connecting the mudflap unit 38 to the support beam 16.

To use the embodiment of the invention shown in FIGS. 1–4, the attachment bracket 12 is bolted onto a portion of a track body frame 13. The support beam 16 is fixed to the rotation hinge 14, and the beam bias spring 18 serves as a resilient shock absorber for the truck light bar and mudflap holder apparatus 10 of the invention. More specifically, if a force is applied horizontally and transversely to the longitudinal axis of the support beam 16, the support beam 16, instead of bending or breaking, rotates along with the rotation hinge 14 in the attachment bracket 12, overcoming the bias force of the beam bias spring 18. Once the horizontally applied force is released, the beam bias spring 18 resiliently urges the support beam 16 to return to its original position.

As shown in FIG. 4, the first light module 24 can includes a first marker lamp 66 and a turn signal lamp 68 which can be yellow in color. The second light module 26 can includes a second marker lamp 70 and a stop lamp 72 which can be red in color. The third light module 27, shown in FIGS. 5 and 6, can include an auxiliary marker lamp 74 which can be yellow in color. All of the lamps can be is connected to electrical power from the truck body by using an electrical harness 29.

Turning to FIGS. 5–8, a second embodiment of the invention is shown. Reference numerals are shown that correspond to like reference numerals that designate like elements shown in the other figures. More specifically, the mudflap-to-beam connector includes a first clamp member 42 connected to the support beam 16. A second clamp member 44 is supported by the support beam 16. The second clamp member 44 is attached to a clamp hinge pin 46, wherein a clamp handle 48 is formed from the clamp hinge pin 46. The clamp hinge pin 46 is supported by clamp support brackets 49 which extend downward from the support beam 16, and clamp springs 52 are connected between the second clamp member 44 and the support beam 16. The first clamp member 42 includes ridges 50 for gripping the mudflap unit 38.

With this embodiment of the invention, the beam-to-body resilient connection assembly includes suspension bolts 54 connected to the truck body and extending from the truck body into the support beam 16. Spring shock absorber assemblies are supported on the suspension bolts 54. Nuts 55 are secured to the suspension bolts 54. The spring shock absorber assemblies includes distal stop members 58 supported on the suspension bolts 54, proximal stop members 60 supported on the suspension bolts 54, and shock absorber springs 62 supported on the suspension bolts 54 between the distal stop members 58 and the proximal stop members 60.

In using the embodiment of the invention shown in FIGS. 5–8, the spring shock absorber assemblies protect the support beam 16 against damage from horizontal forces that are longitudinal between the support beam 16 and the truck body frame 13. More specifically, when such longitudinal horizontal forces are applied to the support beam 16 in a direction away from the truck body frame 13, the shock absorber springs 62 are squeezed between the proximal stop members 60 and the distal stop members 58. In this respect, the support beam 16 is moved horizontally and slightly away from the truck body frame 13 rather than is bent or damaged. When the longitudinal horizontal forces are discontinued, the shock absorber springs 62 cause the support beam 16 to be moved back to the original positions.

With respect to the mudflap assembly, with the embodiment of the invention shown in FIGS. 5–8, to remove a mudflap unit 38 from the mudflap assembly, the clamp handle 48 is pulled in a direction away from the mudflap unit 38. As a result, the bias forces of the clamp springs 52 are overcome, the second clamp member 44 is moved away from the mudflap unit 38 and the first clamp member 42, and the mudflap unit 38 can be released from the mudflap assembly. Then, the clamp handle 48 can be released, and the clamp springs 52 urge the second clamp member 44 towards the first clamp member 42.

To install another mudflap unit 38, the clamp handle 48 is again pulled so that the second clamp member 44 moves away from the first clamp member 42, thereby overcoming the bias forces of the clamp springs 52. Then, another mudflap unit 38 is installed between the second clamp member 44 and the first clamp member 42. Then, the clamp handle 48 is released, and the clamp springs 52 move the second clamp member 44 toward the mudflap unit 38 and the first clamp member 42 causing the mudflap unit 38 to be clamped between the second clamp member 44 and the first clamp member 42.

Figure 6:
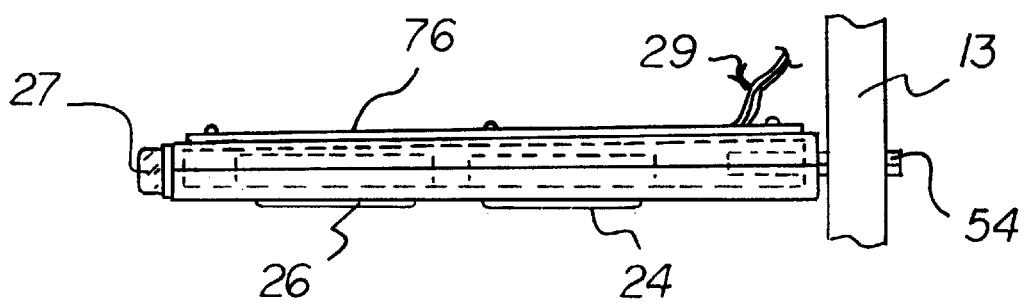
FIG. 6 is a top view of the embodiment of the invention shown in FIG. 5 taken along line 6—6 thereof.

As illustrated in FIGS. 5 and 7, the alternatively preferred support beam 16 comprises a hollow housing of generally tapered trapezoidal shape with the housing tapering to a minimum distally from mounting bolt assemblies 54 and truck frame 13. The light modules are 24 and 26 are suitably mounted interiorly of the housing in a conventional manner with their front faces registering with suitable openings in the front wall of housing/beam 16 as shown in FIGS. 5 and 6 whereas third light module 27 is suitably mounted on the minimum tapered end of housing/beam 16. The various walls of housing/support beam 16 may be fabricated of sheet material such as metal or plastic. A removable rear wall 74 attached by means of screw fasteners may be used to provide convenient access to the interior of the housing/beam 16.

The remaining components of the truck light bar and mudflap holder apparatus of the invention can be made from inexpensive and durable metal and plastic materials and electrical components.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved track light bar and mudflap holder apparatus that is low in cost, relatively simple in design and operation, and which may advantageously supported in such a way on the truck so that it is not coaxial with and does not radiate from its support on the truck. With the invention, a truck light bar and mudflap holder apparatus is provided which includes lighting devices that are not mounted directly on the mudflap itself. With the invention, a truck light bar and mudflap holder apparatus is provided which has auxiliary light supports that are mounted on the sides of a vehicle frame and that include vertically oriented axes of rotation. With the invention, a truck light bar and mudflap holder apparatus is provided which includes a mudflap clamp that permits a mudflap to be easily removed and replaced. With the invention, a truck light bar and mudflap holder apparatus is provided which has light bar lights can serve as auxiliary directional signals. With the invention, a truck light bar and mudflap holder apparatus is provided which has springs that are biased to restore the mudflaps to their original orientations when rotated by road conditions.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A truck light bar and mudflap holder apparatus, comprising:
    a beam-to-body resilient connection assembly for connection to a portion of a truck body,
    a support beam connected to said beam-to-body resilient connection assembly,
    light modules supported by said support beam, and
    a mudflap assembly supported by said support beam.

2. The apparatus of claim 1 wherein said beam-to-body resilient connection assembly includes:
    an attachment bracket connected to the truck body, and
    a rotation hinge connected to said attachment bracket, and
    a beam bias spring connected between said support beam and said attachment bracket.

3. The apparatus of claim 2 wherein said beam bias spring is a spiral spring.

4. The apparatus of claim 3 wherein said rotation hinge extends through a central portion of said beam bias spiral spring.

5. The apparatus of claim 1 wherein said light modules include a first light module and a second light module.

6. The apparatus of claim 5, further including a third light module.

7. The apparatus of claim 1 wherein said support beam includes a first beam end proximal to said beam-to-body resilient connection assembly and a second beam end distal to said beam-to-body resilient connection assembly.

8. The apparatus of claim 7 wherein:
    said first beam end has a first beam height,
    said second beam end has a second beam height, and
    said first beam height is greater than said second beam height.

9. The apparatus of claim 1 wherein said mudflap assembly includes:
    a mudflap unit, and
    a mudflap-to-beam connector means for connecting said mudflap unit to said support beam.

10. The apparatus of claim 9 wherein said mudflap-to-beam connector means includes connection bolts and nuts for connecting said mudflap unit to said support beam.

11. The apparatus of claim 9 wherein mudflap-to-beam connector means includes:
    a first clamp member connected to said support beam,
    a second clamp member supported by said support beam, wherein said second clamp member is attached to a clamp hinge pin, wherein a clamp handle is formed from said clamp hinge pin, and wherein said clamp hinge pin is supported by clamp support brackets which extend downward from said support beam, and
    clamp springs connected between said second clamp member and said support beam.

12. The apparatus of claim 11 wherein said first clamp member include ridges for gripping said mudflap unit.

13. The apparatus of claim 1 wherein said beam-to-body resilient connection assembly includes:
    suspension bolts connected to the truck body and extending from the truck body into said support beam, and
    spring shock absorber assemblies supported on said suspension bolts.

14. The apparatus of claim 13 wherein said spring shock absorber assemblies include:
    distal stop members supported on said suspension bolts,
    proximal stop members supported on said suspension bolts, and
    shock absorber springs supported on said suspension bolts between said distal stop members and said proximal stop members.

* * * * *